A. CARLSON.
HUB BRAKE.
APPLICATION FILED JULY 29, 1911.
1,020,798.
Patented Mar. 19, 1912.
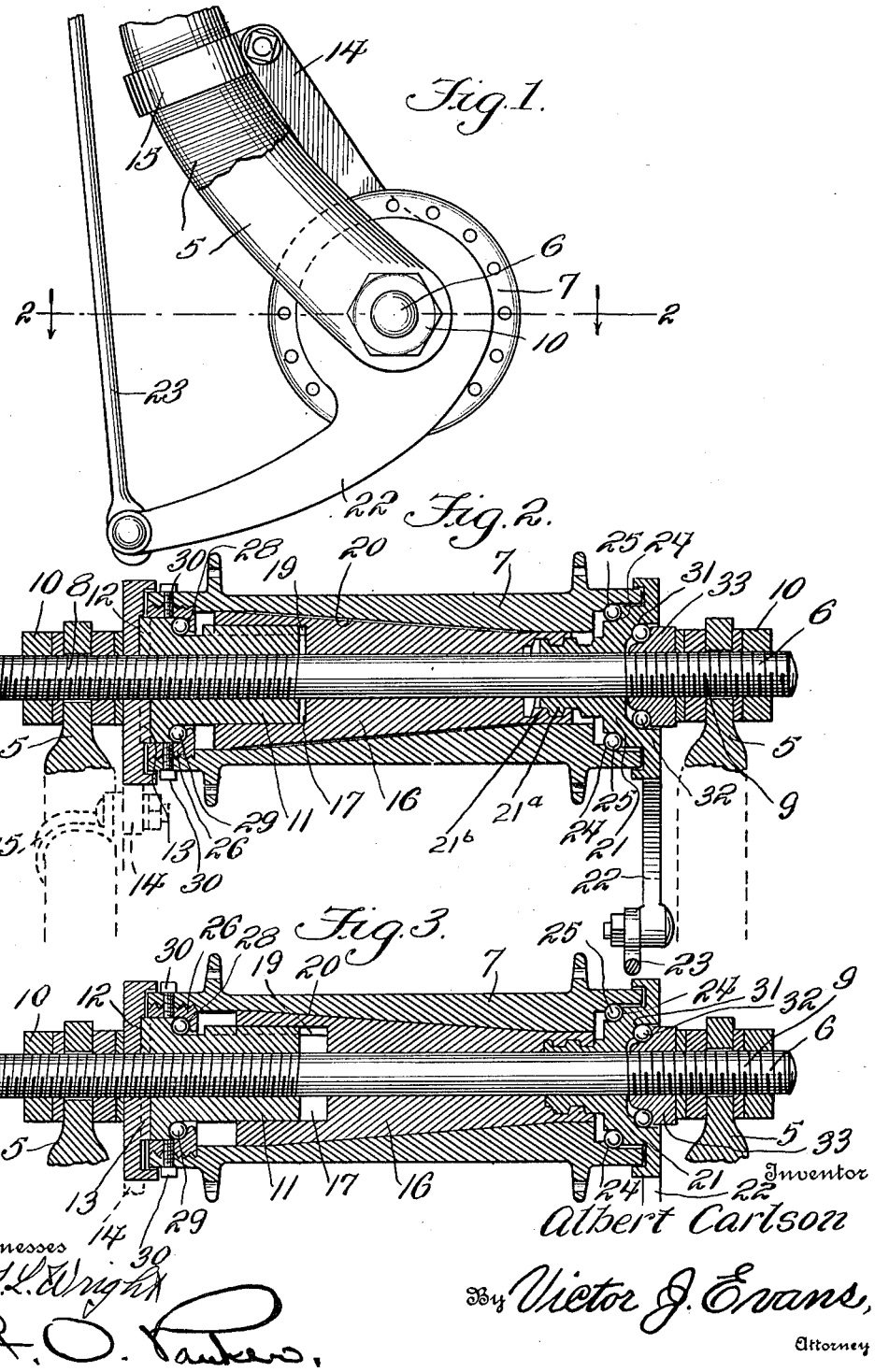
Witnesses
G. T. L. Wright
Inventor
Albert Carlson
By Victor J. Evans,
Attorney

ABERT CARLSON, OF PRESTON, WASHINGTON.

HUB-BRAKE.

1,020,798.   Specification of Letters Patent.   Patented Mar. 19, 1912.

Application filed July 29, 1911. Serial No. 641,260.

*To all whom it may concern:*

Be it known that I, ALBERT CARLSON, a citizen of the United States, residing at Preston, in the county of King and State of Washington, have invented new and useful Improvements in Hub-Brakes, of which the following is a specification.

The invention relates to brakes, and more particularly to the class of hub brakes for bicycles, tricycles, or other velocipedes.

The primary object of the invention is the provision of a brake in which a velocipede, such as a bicycle or tricycle, may be brought to a standstill, the brake being concealed within the hub of the front wheel of the said velocipede, and is readily and easily operated by the rider of the machine.

Another object of the invention is the provision of a brake which is simple in construction, powerful and positive in operation, and also one that may be manufactured at a minimum cost.

Other objects will be in part obvious, and in part pointed out hereinafter.

The invention accordingly consists in the features of construction, combination of elements, and arrangement of parts, which will be exemplified in the construction hereinafter set forth, and the scope of the application of which will be indicated in the following claims.

In the drawings: Figure 1 is a fragmentary side elevation of the front fork of a bicycle, showing a portion of the front wheel, and its hub, with the brake constructed in accordance with the invention mounted therein. Fig. 2 is a vertical longitudinal sectional view through the hub and brake mechanism, the latter being in normally released position. Fig. 3 is a similar view, showing the brake applied.

Similar reference characters indicate corresponding parts throughout the several views of the drawings.

Referring to the drawings by numerals, 5 designates portions of the limbs of the front fork of a bicycle, in which is mounted a front axle 6, upon which is adapted to be mounted the hub shell 7 of the front wheel of the bicycle, only a portion of the latter being shown, as it is of the ordinary well-known construction. The axle 6 is formed with threaded portions 8 and 9, respectively, with which are engaged the usual lock nuts 10 for the securing of the said axle in the limbs of the fork.

Adjustably engaged upon the threaded portion 8 of the axle 6 and disposed within the hub 7 is a guide sleeve 11, the same being formed with an outer ratchet face 12 engaging a similar ratchet face 13 formed on a holding arm 14, the same being connected to a clamping collar 15, which is engaged about the limb 5 adjacent thereto of the front fork, and in this manner the sleeve 11 will be held stationary and against rotation upon the axle 6, the arm 14 being disposed between the sleeve and the said limb 5, adjacent thereto, of the front fork.

Surrounding the axle 6 and adapted for longitudinal movement thereon is a wedging cone 16, the same being formed at one end with a socket 17, in which telescopes the sleeve 11, the latter being provided with a guide key engaging in a guide groove 19 formed in the wall of the socket 17 in the cone 16, the outer surface of the latter being adapted for frictional engagement with the wall of a conical-shaped bore 20 interiorly of the hub shell 7 for locking the hub against rotation upon the axle 6, in a manner presently described.

Upon the axle 6 is loosely mounted a turning or actuating sleeve 21, the same being formed with a threaded end 21$^a$ engaging in companion threads 21$^b$ provided in a suitable socket formed in the cone 16, at its end adjacent to said sleeve, the threaded end of the sleeve telescoping within the socket within the cone end. The sleeve 21 is formed with a downwardly and rearwardly curved operating arm 22, to which is pivotally connected a manually operated brake pull rod 23. Thus, it will be seen that upon turning the sleeve 21 in one direction the cone 16 will be brought into wedging engagement with the wall of the conical bore 20 in the hub for locking engagement therewith, and upon turning the sleeve 21 in the reverse direction, the said cone 16 will be disengaged from the wall of the conical bore 20, thereby freeing the hub for rotation upon the axle, the hub 7 and the turning sleeve 21 being provided with annular bearing ball seats 24, in which are disposed the usual bearing balls 25. Removably threaded in the end of the hub 7, opposite the end in which the sleeve is mounted, is a ball retaining casing 26, the stationary sleeve 11 being provided with an annular ball seat 27, and likewise the casing 26 is provided with a ball seat 28, in which is arranged a series of bearing balls 29, the casing 26 being held fast within the hub 7 by means of set screws 30, so as to prevent any possibility of displacement thereof.

Formed in the outer end of the turning sleeve 21 is a ball cavity 31, in which is arranged a series of bearing balls 32, the same being held therein by means of a ball retaining collar 33 adjustably engaged on the threaded end 9 of the axle 6. Thus, it will be seen that friction will be minimized upon the turning of the sleeve 21 for the breaking of the hub 7.

What is claimed is:

1. The combination with an axle, of a hub rotatable thereon and having a conical bore, a guide sleeve threaded on one end of the axle, a wedging cone within the hub and slidably connected with the guide sleeve for engagement in the bore in the hub, and a turning sleeve loose on the axle and having threaded connection with the wedging cone for engaging the same with and disengaging it from the wall of the conical bore in the hub.

2. The combination with an axle, of a hub rotatable thereon and having a conical bore, a guide sleeve threaded on one end of the axle, a wedging cone within the hub and slidably connected with the guide sleeve for engagement in the bore in the hub, a turning sleeve loose on the axle and having threaded connection with the wedging cone for engaging the same with and disengaging it from the wall of the conical bore in the hub, and means for holding the guide sleeve against rotation on the axle.

3. The combination with an axle, of a hub rotatable thereon and having a conical bore, a guide sleeve threaded on one end of the axle, a wedging cone within the hub and slidably connected with the guide sleeve for engagement in the bore in the hub, a turning sleeve loose on the axle and having threaded connection with the wedging cone for engaging the same with and disengaging it from the wall of the conical bore in the hub, means for holding the guide sleeve against rotation on the axle, and bearings interposed between the hub and said sleeves.

4. The combination with an axle, of a hub rotatable thereon and having a conical bore, a guide sleeve threaded on one end of the axle, a wedging cone within the hub and slidably connected with the guide sleeve for engagement in the bore in the hub, a turning sleeve loose on the axle and having threaded connection with the wedging cone for engaging the same with and disengaging it from the wall of the conical bore in the hub, means for holding the guide sleeve against rotation on the axle, bearings interposed between the hub and said sleeves, and manually controlled means operating the turning sleeve.

5. The combination with the front axle of a velocipede, of a hub rotatable thereon and having a conical bore, a guide sleeve threaded on one end of the axle, a wedging cone within the hub and slidably connected with the guide sleeve for engagement in the bore in the hub, a turning sleeve loose on the axle and having threaded connection with the wedging cone for engaging the same with and disengaging it from the wall of the conical bore in the hub, means for holding the guide sleeve against rotation on the axle, bearings interposed between the hub and said sleeves, manually controlled means operating the turning sleeve, and means locking the axle fixed in the front fork of such velocipede.

In testimony whereof I affix my signature in presence of two witnesses.

ALBERT CARLSON.

Witnesses:
N. R. HARSHMAN,
L. V. HOWELL.

---

Copies of this patent may be obtained for five cents each, by addressing the "Commissioner of Patents, Washington, D. C."